United States Patent
Jan et al.

(10) Patent No.: US 9,115,586 B2
(45) Date of Patent: Aug. 25, 2015

(54) AXIALLY-SPLIT RADIAL TURBINE

(75) Inventors: David K. Jan, Fountain Hills, AZ (US); Christopher Zollars, Tempe, AZ (US); Rajiv Rana, Tempe, AZ (US); Tom Polakis, Tempe, AZ (US); Ardeshir Riahi, Scottsdale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 648 days.

(21) Appl. No.: 13/451,245

(22) Filed: Apr. 19, 2012

(65) Prior Publication Data

US 2013/0280036 A1   Oct. 24, 2013

(51) Int. Cl.
| | |
|---|---|
| *F01D 5/02* | (2006.01) |
| *F01D 5/04* | (2006.01) |
| *F01D 5/08* | (2006.01) |
| *F01D 5/18* | (2006.01) |
| *F01D 5/06* | (2006.01) |
| *F01D 1/24* | (2006.01) |

(52) U.S. Cl.
CPC ...... *F01D 5/026* (2013.01); *F01D 1/24* (2013.01); *F01D 5/04* (2013.01); *F01D 5/066* (2013.01); *F01D 5/088* (2013.01); *F01D 5/18* (2013.01); *Y02T 50/671* (2013.01); *Y02T 50/673* (2013.01); *Y02T 50/676* (2013.01)

(58) Field of Classification Search
CPC ............ F01D 5/026; F01D 5/066; F01D 5/18; F01D 5/088; F01D 5/04; F01D 1/24; Y02T 50/676; Y02T 50/671; Y02T 50/673
USPC .......... 415/115, 143, 176, 177; 416/175, 416/198 R, 198 A, 200 A, 201 R, 203
See application file for complete search history.

(56) References Cited

U.S. PATENT DOCUMENTS

| | | | | | |
|---|---|---|---|---|---|
| 2,439,127 | A | * | 4/1948 | Dailey, Jr. et al. | 266/256 |
| 2,859,933 | A | | 11/1958 | Whitaker | |
| 2,941,780 | A | | 6/1960 | Von Der Nuell et al. | |
| 3,297,301 | A | | 1/1967 | Petrie et al. | |
| 3,582,232 | A | * | 6/1971 | Okapuu | 416/90 R |
| 3,628,880 | A | | 12/1971 | Smuland et al. | |
| 3,642,383 | A | | 2/1972 | Andvig | |

(Continued)

FOREIGN PATENT DOCUMENTS

| | | |
|---|---|---|
| DE | 3802763 A1 | 8/1989 |
| EP | 1840385 A2 | 10/2007 |

(Continued)

OTHER PUBLICATIONS

Hammer A. N., Algret G. G., Psichogios T. P., Rodgers C.; Fabrication of Cooled Radial Turbine Rotor—Final Report (Solar Turbines International), NASA-CR-179503; Jun. 1986.*

(Continued)

*Primary Examiner* — Dwayne J White
*Assistant Examiner* — Brian P Wolcott
(74) *Attorney, Agent, or Firm* — Ingrassia Fisher & Lorenz, P.C.

(57) ABSTRACT

An axially-split radial turbine includes a forward rotor section and an aft rotor section being mechanically and abuttingly coupled to one another along an annular interface that resides within a plane generally orthogonal to a rotational axis of the axially-split radial turbine. The axially-split radial turbine can be provided as part of a gas turbine engine.

17 Claims, 7 Drawing Sheets

(56) References Cited

U.S. PATENT DOCUMENTS

| | | | |
|---|---|---|---|
| 3,818,696 A | | 6/1974 | Beaufrere |
| 4,183,719 A | * | 1/1980 | Bozung ............ 416/183 |
| 4,263,992 A | | 4/1981 | Moore et al. |
| 4,335,997 A | | 6/1982 | Ewing et al. |
| 4,416,581 A | * | 11/1983 | Geary, Jr. ............ 415/1 |
| 4,417,381 A | | 11/1983 | Higginbotham |
| 4,428,717 A | | 1/1984 | Catterfeld |
| 4,447,188 A | | 5/1984 | Davis et al. |
| 4,529,452 A | | 7/1985 | Walker |
| 4,538,331 A | | 9/1985 | Egan et al. |
| 4,554,789 A | | 11/1985 | Napoli et al. |
| 4,573,315 A | | 3/1986 | Stroem |
| 4,587,700 A | | 5/1986 | Curbishley et al. |
| 4,641,495 A | | 2/1987 | Mowill |
| 4,659,288 A | | 4/1987 | Clark et al. |
| 4,729,715 A | | 3/1988 | Wilde |
| 4,759,688 A | | 7/1988 | Wright et al. |
| 4,822,244 A | * | 4/1989 | Maier et al. ........ 416/95 |
| 4,826,397 A | | 5/1989 | Shook et al. |
| 4,923,370 A | | 5/1990 | Larson et al. |
| 5,061,154 A | | 10/1991 | Kington |
| 5,280,703 A | | 1/1994 | Corrado et al. |
| 5,497,615 A | | 3/1996 | Noe et al. |
| 5,572,862 A | | 11/1996 | Mowill |
| 5,832,718 A | | 11/1998 | Suttrop |
| 6,089,821 A | | 7/2000 | Maguire et al. |
| 6,146,091 A | | 11/2000 | Watanabe et al. |
| 6,196,792 B1 | | 3/2001 | Lee et al. |
| 6,325,871 B1 | | 12/2001 | Burke et al. |
| 6,331,217 B1 | | 12/2001 | Burke et al. |
| 6,351,938 B1 | | 3/2002 | Kerrebrock |
| 6,430,917 B1 | | 8/2002 | Platts |
| 6,805,535 B2 | | 10/2004 | Tiemann |
| 6,814,544 B2 | | 11/2004 | Tsukamoto et al. |
| 7,044,718 B1 | | 5/2006 | Platts |
| 7,378,132 B2 | | 5/2008 | Renteria et al. |
| 7,441,331 B2 | | 10/2008 | Hudson et al. |
| 7,458,766 B2 | | 12/2008 | Dailey et al. |
| 7,584,538 B2 | | 9/2009 | Lee |
| 7,654,094 B2 | | 2/2010 | Yagi et al. |
| 7,841,083 B2 | | 11/2010 | Alaux et al. |
| 8,015,705 B2 | | 9/2011 | Wilson, Jr. et al. |
| 8,061,989 B1 | | 11/2011 | Liang |
| 8,087,249 B2 | | 1/2012 | Ottaviano et al. |
| 8,147,208 B2 | | 4/2012 | Hagshenas et al. |
| 8,408,446 B1 | | 4/2013 | Smoke et al. |
| 2006/0034695 A1 | | 2/2006 | Hall et al. |
| 2009/0056125 A1 | | 3/2009 | Howe et al. |
| 2010/0124483 A1 | | 5/2010 | Weaver et al. |
| 2010/0158668 A1 | | 6/2010 | Ottaviano et al. |
| 2011/0318183 A1 | | 12/2011 | Noronha et al. |
| 2013/0004316 A1 | | 1/2013 | Matwey et al. |
| 2013/0098061 A1 | | 4/2013 | Matwey et al. |
| 2013/0272882 A1 | | 10/2013 | Mittendorf et al. |
| 2013/0280036 A1 | | 10/2013 | Jan et al. |

FOREIGN PATENT DOCUMENTS

| | | |
|---|---|---|
| EP | 2653652 A2 | 10/2013 |
| GB | 741054 A | 11/1955 |
| GB | 2354043 A | 3/2001 |
| JP | 2004232622 A | 8/2004 |

OTHER PUBLICATIONS

Snyder, P.H.; Cooled High-Temperature Radial Turbine Program, NASA National Aeronautics and Space Administration, NASA CR 189122 USAAVSCOM TR-92-C-010 Report No. EDR 15982; AD-A254827.

Hammer, A.N. et al.; Fabrication of Cooled Radial Turbine Rotor; Final Report NASA CR-19503; Solar Turbines Incorporation, Jun. 1986.

EP Search Report for Application No. 14166274.2-1610/2803820 dated Dec. 18, 2014.

EP Exam Report for Application No. 14166274.2-1610 dated Jan. 22, 2015.

Notice of Allowance and Fee(s) Due for U.S. Appl. No. 13/444,070 dated Jan. 20, 2015.

USPTO Office Action, Notification Date Nov. 19, 2014; U.S. Appl. No. 13/444,070.

* cited by examiner

AXIALLY-SPLIT RADIAL TURBINE

TECHNICAL FIELD

The present invention relates generally to gas turbine engines and, more particularly, to axially-split radial turbines for usage within gas turbine engines.

BACKGROUND

Gas turbine engines ("GTE") have been engineered extensively to improve efficiency, thrust-to-weight ratios, and other measures of engine performance. One of the most direct manners by which engine performance can be improved is through increases in the core rotational speeds and turbine inlet temperatures generated during engine operation. However, as turbine inlet temperatures and rotational speeds increase, so too do the thermal and mechanical demands placed on the GTE components. The most demanding performance requirements are typically placed on the high pressure turbine rotor or rotors, which are positioned immediately downstream of the GTE combustion section and which rotate at the greatest speed during engine operation. The turbine blades, in particular, are directly exposed to combustive gas flow at or near peak temperatures and are consequently heated to exceedingly high temperatures at which most alloys weaken or melt and become prone to oxidation or other forms of chemical degradation. By comparison, the inner portion of the turbine (commonly referred to as the "turbine disk") is largely shielded from direct exposure to combustive gas flow, but is subject to considerable mechanical stress resulting from the centrifugal forces acting on the turbine rotor at high rotational speeds.

Turbines can be broadly divided into two categories, axial and radial turbines, based upon the direction of airflow received by the turbine relative to the turbine's rotational axis. Relative to axial turbines, radial turbines offer certain performance benefits including decreased thermal and mechanical stresses, which enable the turbine to operate at greater efficiencies and at higher temperatures. However, due to the nature of their design, radial turbines are relatively lengthy in the axial direction. As a result, a radial turbine can be undesirably heavy and cumbersome. Axial turbines can readily be cooled, which allows such turbines to operate at high inlet temperature, while despite the proposal of multiple cooled radial turbine concepts, there are no cooled radial turbines currently implemented in commercial gas turbine engine platforms. As a result, majority of gas-turbine engine employing radial turbine are operating at much lower turbine inlet temperature relative to those employing an axial turbine. In addition, it is often difficult to fabricate radial turbines utilizing conventional casting processes, especially if such radial turbines include relatively complex internal cooling flow passages. Still further, present blade cooling schemes are unable to adequately cool the blade tip and the "saddle" region (between blades) of the turbine, resulting in undesirable high component metal operating temperatures and temperature gradients, especially during start-up conditions. For at least these reasons, and despite the proposal of multiple radial turbine designs in the prior art, few currently-implemented gas turbine engine platforms incorporate radial turbines.

It would thus be desirable to provide a radial turbine suitable for usage in a gas turbine engine that is relatively lightweight and cost effective to manufacture and implement, can operate at elevated turbine inlet temperature levels, and that has improved blade tip and saddle region cooling characteristics. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of an axially-split radial turbine are provided. In one embodiment, the axially-split radial turbine includes a forward rotor section and an aft rotor section being mechanically and abuttingly coupled to one another along an annular interface that resides within a plane generally orthogonal to a rotational axis of the axially-split radial turbine.

In another embodiment, the axially-split radial turbine includes a forward rotor section and an aft rotor section being mechanically and abuttingly coupled to one another along an annular interface that resides within a plane generally orthogonal to a rotational axis of the axially-split radial turbine, an inner annular cavity fully defined within the axially-split radial turbine, and a tie shaft for abuttingly coupling the forward rotor section to the aft rotor section. The forward rotor section comprises a forward blade segment and a forward hub section metallurgically bonded together along a first bond line and wherein the aft rotor section comprises an aft blade segment and an aft hub section metallurgically bonded together along a second bond line. When the forward rotor section and the aft rotor section are coupled to one another, the forward blade segment and the aft blade segment define a contiguous radial turbine blade. Furthermore, the forward hub section defines a first annular cavity groove and wherein the aft hub section defines a second annular cavity groove, wherein when the forward rotor section and the aft rotor section are coupled to one another, the first and second annular grooves define the inner annual cavity.

In yet another embodiment, an axially-split radial turbine is provided as part of a gas turbine engine. The axially-split radial turbine as part of the gas turbine engine includes a forward rotor section and an aft rotor section being mechanically and abuttingly coupled to one another along an annular interface that resides within a plane generally orthogonal to a rotational axis of the axially-split radial turbine.

BRIEF DESCRIPTION OF THE DRAWINGS

At least one example of the present invention will hereinafter be described in conjunction with the following figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
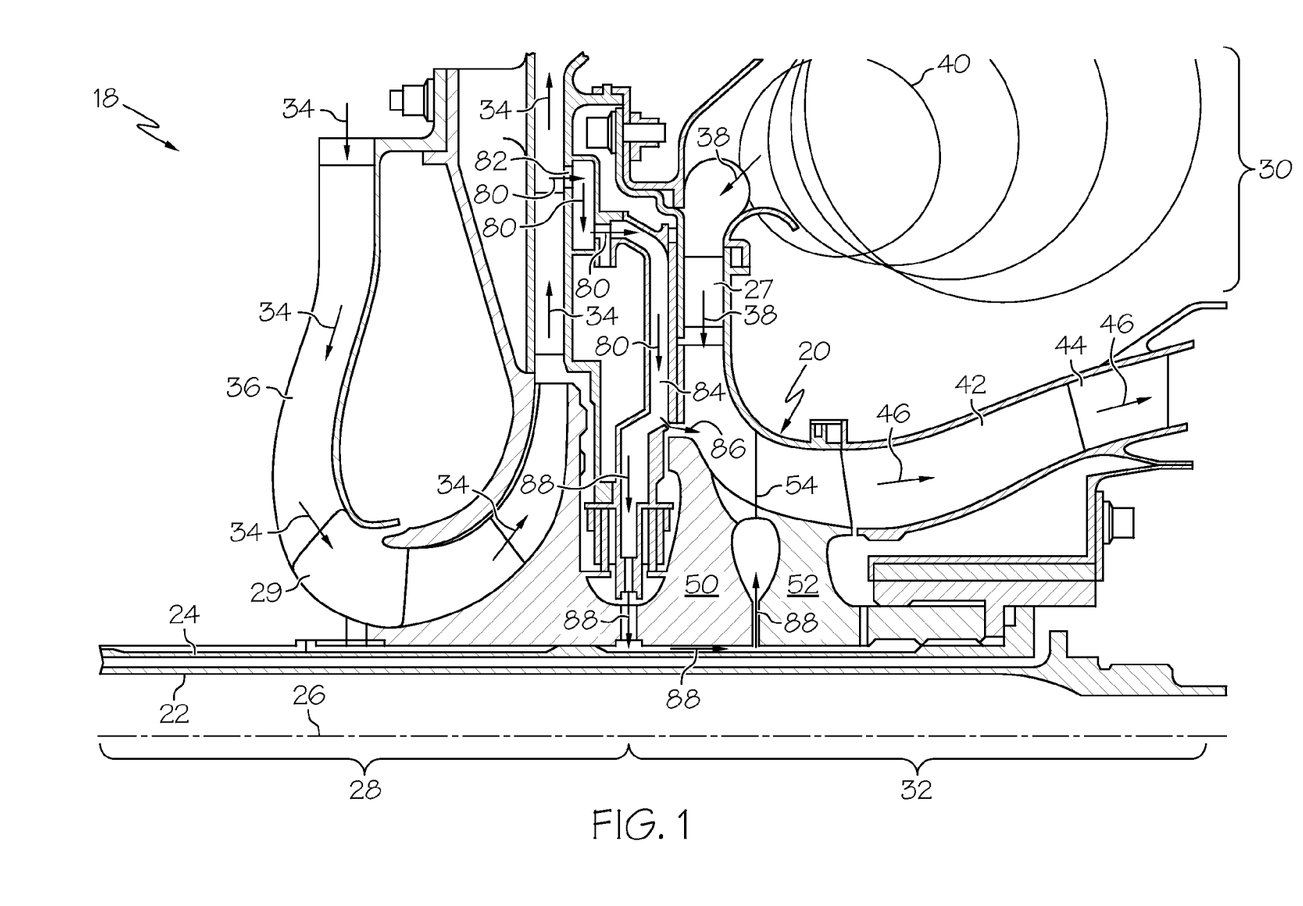
FIG. 1 is a simplified schematic illustration of an exemplary gas turbine engine (partially shown) including an axially-split radial turbine, as illustrated in accordance with an exemplary embodiment of the present invention.

FIG. 1 is a simplified cross-sectional view of a portion of a gas turbine engine (GTE) 18 including an internally-cooled, axially-split radial turbine 20, as illustrated in accordance with an exemplary embodiment of the present invention. As illustrated in FIG. 1 and described herein, GTE 18 is offered by way of example only to provide a convenient and non-limiting context in which an exemplary embodiment of radial turbine 20 can be described. It will be readily appreciated that embodiments of axially-split radial turbine 20 can be employed within various types of gas turbine engines including, but not limited to, other types of turbofan, turboprop, turboshaft, and turbojet engines, whether deployed onboard an aircraft, watercraft, or ground vehicle (e.g., a tank), included within an auxiliary power unit, included within industrial power generators, or utilized within another platform or application.

In the exemplary embodiment shown in FIG. 1, GTE 18 is illustrated as a two spool engine including a low pressure (LP) shaft 22 and a high pressure (HP) shaft 24. LP shaft 22 and HP shaft 24 are co-axial; that is, LP shaft 22 extends through a longitudinal channel provided through HP shaft 24 along a rotational axis 26. GTE 18 further includes a compressor section 28, a combustion section 30, and a turbine section 32, each of which is only partially shown in FIG. 1. An HP compressor 29 is included within compressor section 28 and mounted to the upstream or forward end of HP shaft 24. Radial turbine 20, which is contained within turbine section 32, is mounted to the opposing, aft end of HP shaft 24 as the HP turbine. Although not shown in FIG. 1 for clarity, compressor section 28 and turbine section 32 may further include an LP compressor and an LP turbine, respectively, which may be mounted to opposing ends of LP shaft 22.

During engine operation, airflow is received from a non-illustrated intake section included within GTE 18 and supplied to compressor section 28. As indicated in FIG. 1 by arrows 34, a compressor section duct 36 guides the pressurized airflow through HP compressor 29, which further compresses the airflow prior to discharge into combustion section 30. The compressed airflow is directed into a combustion chamber (not shown) included within combustion section 30, mixed with fuel, and ignited to produce combustive gasses. As indicated in FIG. 1 by arrows 38, the combustive gasses expand rapidly, exit combustion section 30 through a turbine scroll 40, and are directed through a duct 27 radial turbine 20. The combustive gas flow drives rotation of radial turbine 20, which drives further rotation of HP shaft 24 and HP compressor 29. After flowing through radial turbine 20, a turbine section duct 42 directs the combustive gas flow into a turbine nozzle ring 44 (indicated in FIG. 1 by arrows 46). Turbine nozzle ring 44 accelerates the combustive gas flow and imparts the gas flow with a desired tangential component prior to reaching an LP turbine (not shown), which is positioned downstream of nozzle ring 44 and mounted to the aft end of LP shaft 22. The combustive gas flow drives the rotation of the non-illustrated LP turbine, which drives further rotation of the LP turbine and LP shaft 22. Collectively, the rotation of shafts 22 and 24 provides power output, which may be utilized in a variety of different manners, depending upon whether GTE 18 assumes the form of a turbofan, turboprop, turboshaft, turbojet engine, or an auxiliary power unit, to list but a few examples. The combustive gas flow is then mixed with cooler bypass flow and exhausted from GTE 18. For example, in the case of turbofan and turbojet engine, the combustive gas flow may be exhausted through a propulsion nozzle to provide forward thrust.

As indicated above, radial turbine 20 is internally cooled and axially split; that is, fabricated from at least two discrete portions, which are separated along a plane orthogonal to rotational axis 26 and which are assembled to produce a completed turbine. In the exemplary embodiment illustrated in FIG. 1, specifically, radial turbine 20 includes two halves: a forward turbine rotor 50, and an aft turbine rotor 52. The aft face of forward turbine rotor 50 and the forward face of aft turbine rotor 52 abut along a generally annular interface, which resides within the plane generally orthogonal to rotational axis 26 and which is referred to herein as "split line 54." Forward turbine rotor 50 and aft turbine rotor 52 can be metallurgically bonded utilizing, for example, soldering, brazing, or diffusion bonding. However, in preferred embodiment, forward turbine rotor 50 and aft turbine rotor 52 are assembled as discrete, non-bonded pieces, which are maintained in engagement utilizing mechanical means, as opposed to metallurgical bonding. As used herein, the term "mechanical means" generally refers to an engagement of a first and a second component by a third component through the application of force. For example, forward turbine rotor 50 and aft turbine rotor 52 may be clamped together utilizing, for example, a tie shaft or curvic (not shown). Alternatively, a plurality of bolts or other such fasteners (not shown) may be employed for such engagement.

The axially-split design of radial turbine 20 offers several advantages not provided by conventional one piece or monolithic turbines, whether axial or radial, and specifically overcomes several disadvantages associated with monolithic radial turbines. First, by assembling radial turbine 20 from multiple pieces, fabrication (e.g., casting and machining) of the turbine pieces can be enhanced. In particular, by reducing casting volume, components can be cast having more complex internal geometries thereby facilitating fabrication of components having internal cooling passages. Second, the multi-piece construction of radial turbine 20 facilitates the formation of internal voids within the central disk of turbine 20, whether created as cast-in features or through strategic removal of material. As a result, the overall mass of radial turbine 20 can be favorably reduced. Additionally, the disk of radial turbine 20 can be fabricated to include an internal cooling circuit, which may supply relatively cool airflow to the internal cooling passages formed within the turbine blades, as described more fully below. Third, the axially-split design of radial turbine 20 enables forward turbine rotor 50 and an aft turbine rotor 52 to be fabricated from disparate materials tailored to the disparate operating conditions experienced by the aft and forward sections of rotor 52 during operation, as still further described below. Fourth, the axially-split design of the radial turbine allows the two halves of the blades to be thermally independent which results in reduction in blade thermal stresses.

Figure 2:
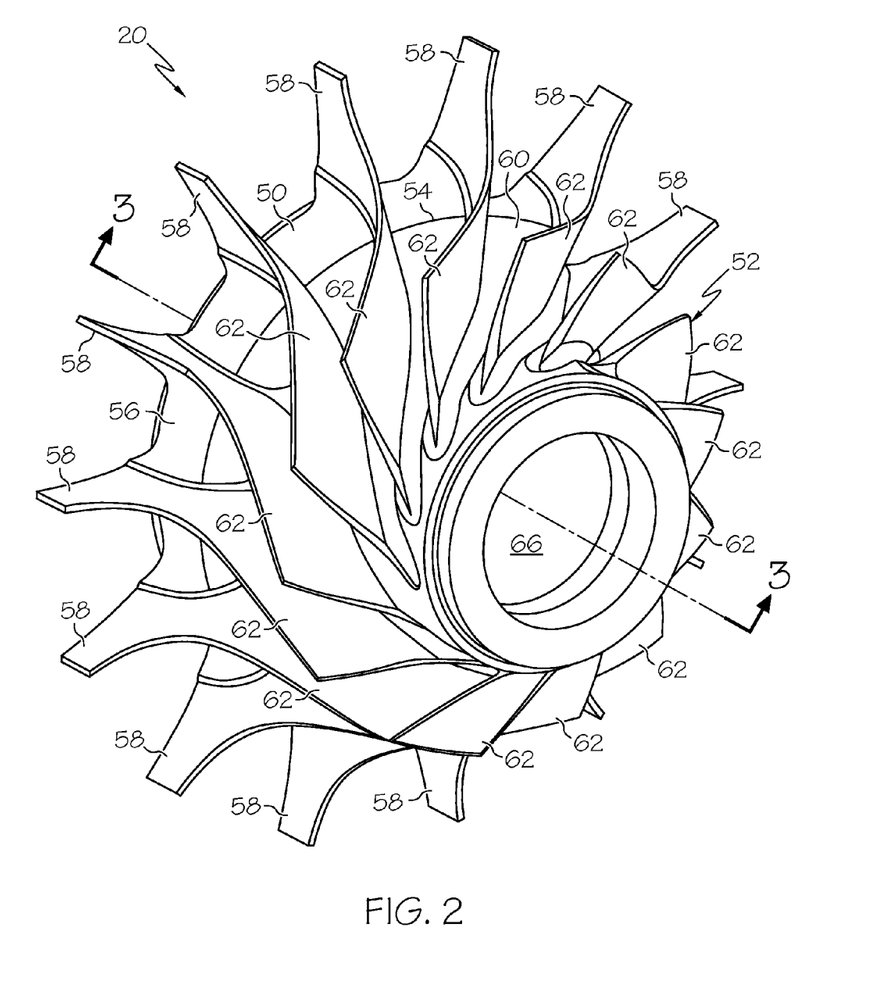
FIG. 2 is an isometric view of the axially-split radial turbine illustrated in FIG. 1.
Figure 3:
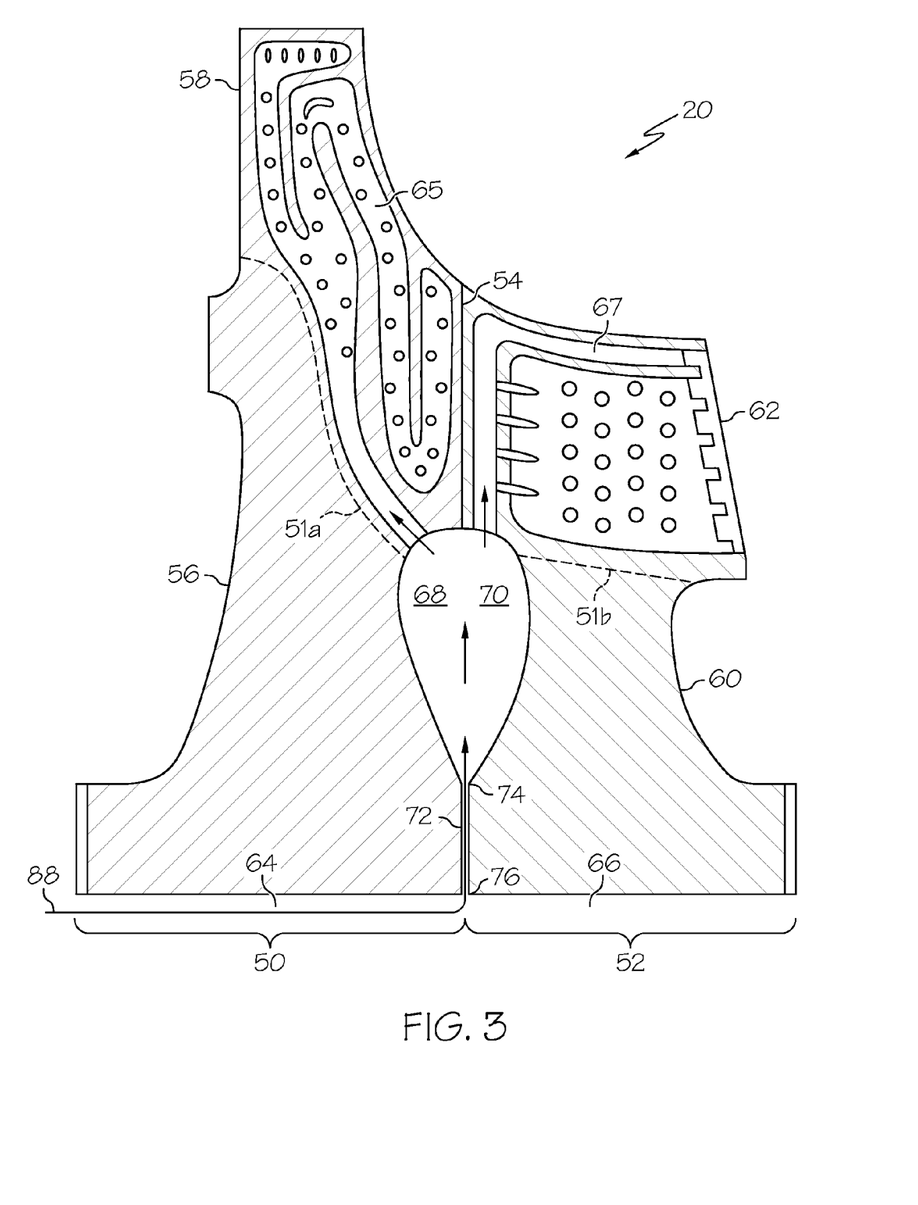
FIG. 3 is a cross-sectional view of a portion of the axially-split radial turbine, as taken along line 3-3 identified in FIG. 2.

FIG. 2 is an isometric view of radial turbine 20, and FIG. 3 is a cross-sectional view of a portion of radial turbine 20, as taken along line 3-3 identified in FIG. 2. As can be seen in FIGS. 2 and 3, forward turbine rotor 50 includes a forward hub section 56 and a plurality of forward blade segments 58 (i.e., inducer blade segments), which are circumferentially spaced around and extend radially outward from hub section 56. Aft turbine rotor 50 likewise includes an aft hub section 60 and a plurality of aft blade segments 62 (i.e., exducer blade segments), which are circumferentially spaced around and extend radially outward from hub section 60. Bond lines 51a and 51b illustrate the bonding region between forward hub section 56 and blades segments 58, and aft hub section 60 and blade segments 62, as will be described in greater detail below. Forward blade segments 58 and aft blade segments 62 are shown in FIG. 3 in cutaway through the blade segments to illustrate various internal cooling features 65, 67, such as internal cooling channels, slots, apertures, and the like, which may be formed in blade segments 58 and/or blade segments 62 and as are known in the art. As such, it will be appreciated by those skilled in the art that FIG. 3 is not a truly planar cross-section of the turbine, but rather follows the curvature of the blade segments 58 and 62.

Forward hub section 56 and aft hub section 60 assume the form of generally annular bodies having central openings 64 and 66 therein, respectively, as identified in FIG. 3. In the illustrated example shown in FIGS. 1 and 3, the inner diameter of central opening 64 provided through forward hub section 56 is generally equivalent to the inner diameter of central opening 66 provided through aft hub section 60. When radial turbine 20 is assembled, forward hub section 56 aligns axially with aft hub section 60 and, preferably, radially pilots thereto. Although not shown in FIGS. 1 and 3 for clarity, a radially-overlapping hub interface (e.g., an annular lap joint) may be provided between forward hub section 56 and aft hub section 60 to radially pilot hub section 56 to forward hub section 60. In this manner, hub sections 56 and 60 combine to form a central hub 56, 60 when radial turbine 20 is assembled. Central openings 64 and 66 likewise align when radial turbine 20 is assembled to define a central opening 64, 66 through radial turbine 20. Further, blade segments 58 and 62 combine to form a contiguous turbine blade 58, 62. When radial turbine 20 is installed within GTE 18 (FIG. 1), a spool (e.g., high pressure shaft 24 of GTE 18) extends through this longitudinal channel. Radial turbine 20 is fixedly mounted to the gas turbine engine spool utilizing, for example, a curvic-type attachment.

When axially-split radial turbine 20 is assembled, forward blade segments 58 align axially with aft blade segments 62. Forward blade segments 58 and aft blade segments 62 abut and, in certain cases, may interlock. Axial alignment of forward blade segments 58 and aft blade segments 62 may also be maintained by an axial clamping force or pre-load exerted on radial turbine 20 by a tie-shaft (not shown). Additionally, the mating interface between forward hub section 56 and aft hub section 60 may be fabricated to include one or more alignment features (e.g., keys, teeth, or castellations). As a result of this structural configuration, neighboring pairs of forward blade segments 58 and aft blade segments 62 cooperate to form contiguous blade structures 58, 62, which provide continuous or uninterrupted transitions between blade segment surfaces (i.e., from the inducer to the exducer). When assembled, radial turbine 20 provides substantially uninterrupted airflow guidance surfaces along the blade passage and, specifically, when transitioning from forward hub section 56 and aft hub section 60, to minimize leakage of the compressed airflow between sections 56 and 60. In so doing, axially-split radial turbine 20 achieves aerodynamic performance levels substantially equivalent to that provided by a radial turbine having a unitary or monolithic construction.

By virtue of its multi-piece construction, axially-split radial turbine 20 can be readily fabricated to include at least one inner disk cavity 68, 70 (shown in FIG. 3) for mass reduction and/or for cooling purposes. For example, as indicated in FIGS. 1 and 3, material may be removed from the back or trailing face of forward hub section 56 to form a first annular cavity or groove 68 therein. Similarly, material may be removed from the front or leading face of aft hub section 60 to form a second annular cavity or groove 70 therein. When radial turbine 20 is assembled, the trailing face of forward turbine rotor 50 is positioned adjacent the leading face of aft turbine rotor 52, and grooves 68 and 70 cooperate to define an annular cavity 68, 70 within radial turbine 20. Inner annular cavity 68, 70 is fully contained within radial turbine 20. Consequently, the provision of annular cavity 68, 70 has minimal impact on the overall structural integrity of radial turbine 20. In further embodiments, a plurality of discrete, circumferentially-spaced cavities can be formed within radial turbine 20 as opposed to a continuous annular cavity. In further embodiments, grooves 68 and 70 can be fabricated as integral cast-in features. Notably, the creation of an internal cavity or cavities within radial turbine 20 facilitates the formation the hub cooling passages through central hub 56, 60 of radial turbine 20, as described below.

With continued reference to FIGS. 1 and 3, and as shown most clearly in FIG. 3, axially-split radial turbine 20 is fabricated to include a plurality of hub cooling air passages 72 (one of which is shown in FIG. 3). As shown in FIGS. 1 and 3, cooling passages 72 each extend radially through turbine central hub 56, 60 to fluidly couple the external hub flow paths to the interior of turbine hub 56, 60 and, specifically, to annular cavity 68, 70. Each hub cooling passage 72 includes an inlet 76 and an outlet 74, which are formed in the respective inner and outer circumferential surfaces of hub 56, 60. Outlet 74 is fluidly coupled to annular cavity 68, 70. Annular cavity 68, 70 may be, in turn, fluidly coupled to the inlet or inlets of one or more cooling flow passages formed within forward blade segments 58 and/or aft blade segments 62. For example, as shown in FIG. 3, annular cavity 68, 70 may be fluidly coupled to the inlet of a first flow passage 65 formed within each forward blade segment 58 and to the inlet of a second flow passage 67 formed within each aft blade segment 62. During operation of GTE 18 (FIG. 1), airflow may be bled from a section of the engine upstream of combustion section 30; e.g., as indicated in FIG. 1 by arrows 80, a portion of the airflow flowing within compressor section duct 36 may be diverted into outlet 82 of a combustion bypass conduit 84. A portion of this cooler bypass airflow may be directed via an aperture in the conduit toward the leading edge of forward hub section 56 to provide saddle region cooling (indicated in FIG. 1 by arrow 86), while the remainder other bypass air (indicated by arrow 88) may be directed radially inward toward the engine centerline, flow axially along HP shaft 24, and may ultimately flow into inlet 76 of hub cooling air passages 72 to provide cooling of hub 56, 60, and blade segments 58 and 62 (indicated in FIG. 1 by arrows 88). (In an alternative embodiment, a TOBI system that processes compressor discharge air may be employed to provide cooling air). In some embodiments, the cooling air flow 88 may be turbulated prior to entering HP shaft 24. Turbulating features may be machined or cut into the turbine rotor prior to the region where the cooling air flows into HP shaft 24 (not shown).

Figure 4:
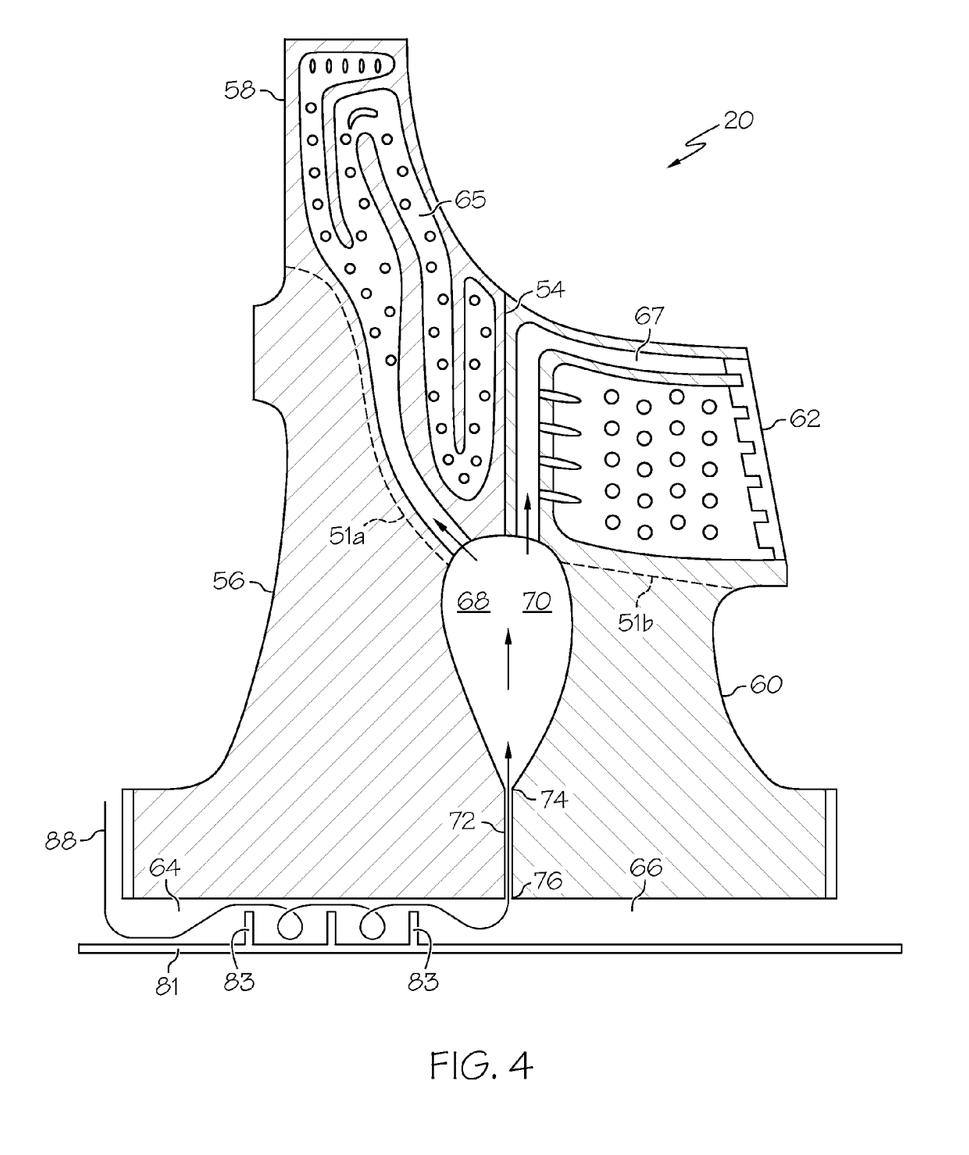
FIG. 4 is a cross-sectional view of an alternative embodiment of an axially-split radial turbine.

FIG. 4 discloses an alternative cooling scheme as compared to that of FIGS. 1 and 3. In the embodiment of FIG. 4, a sleeve 81 underneath shaft 24 is provided with a plurality of turbulating features 83 to turbulate the cooling air 88 prior to its entry into cooling passage 72.

As noted above, forward turbine rotor 50 and aft turbine rotor 52 can be fabricated from disparate materials tailored to the disparate operating conditions experienced by the aft and fore sections of rotor 50, 52. For example, as the temperatures to which forward turbine rotor 50 is exposed will typically be significantly higher than the temperatures to which aft turbine rotor 52 is exposed, forward turbine rotor 50 may be fabricated from a metal or alloy, such as a nickel-based superalloy, having a relatively high density and thermal tolerance. In contrast, aft turbine rotor 52 may be fabricated from a metal or alloy having a lower thermal tolerance (e.g., a titanium-based superalloy) and a lower density. In this manner, the temperature capabilities of turbine 20 can be maximized to improve various measures of engine performance (e.g., specific fuel consumption and power density), while the overall weight of turbine 20 is reduced as compared a monolithic or single piece impeller fabricated entirely from a heavier superalloy having higher thermal tolerances.

Criteria other than relative densities and thermal tolerances may be utilized to select the material or materials from which aft turbine rotor 52 and forward turbine rotor 50 are fabricated. For example, as mechanical stress arising from centrifugal forces will typically concentrate in forward turbine rotor 50, turbine rotor 50 may be fabricated from a material having a relatively high mechanical strength to decrease the likelihood of crack formation and propagation, and improve creep resistance, during high speed operation of turbine 20. Additionally, turbine rotors 50 and 52 may be fabricated from the same or similar alloy, but subjected to different process steps (forged and/or heat treated differently) to tailor material properties (e.g., grain sizes) to the particular conditions to which the individual pieces are subjected.

Figure 5:
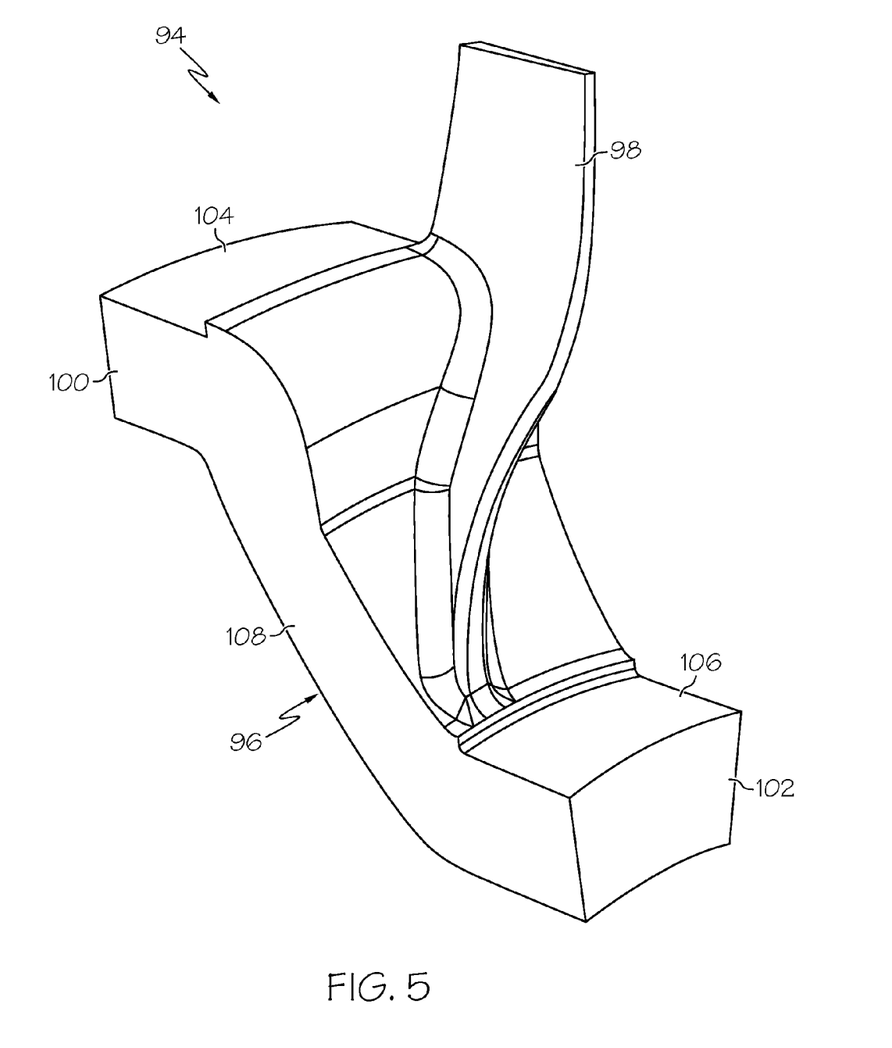
FIG. 5 is an isometric view of an exemplary bladed piece.

In some embodiments, a ring of blade structures 58 and 62 may be formed by metallurgical bonding a series of bladed pieces together. As utilized herein, the term "bladed piece" denotes any structural element or assemblage of structural elements at least a portion of which has a generally arc-shaped or curved geometry and which are able to be arranged in a partial or complete ring formation with a number of like bladed pieces. Each bladed piece will typically include a wedge-shaped shank from which one or more turbine or compressor blades radially project. FIG. 5 presents an isometric view of an exemplary bladed piece 94. In this particular example, bladed piece 94 includes a wedge-shaped body or shank 96 and a blade 98 extending radially therefrom. Shank 96 has been cast or otherwise fabricated to include an outer sacrificial portion that envelops or encompasses the desired shape of the completed shank. Stated differently, shank 96 is a rough casting or preform physically embodying the finished shank, which may be subsequently defined by further machining. Shank 96 includes a forward shoulder 100 and an aft shoulder 102, which extend from the central body of shank 96 in opposing axial directions. Opposing axial shoulders 100 and 102 are fabricated to include outer tooling contact surfaces 104 and 106, respectively, which are located axially adjacent the forward and aft ends of blade 98 and which have a gently curved or arced outer geometry. Shank 96 also includes opposing lateral faces or sidewall surfaces 108, only one of which can be seen in FIG. 5. Sidewall surfaces 108 are each angled to impart shank 96 with a wedge-shaped geometry, when viewed from the forward/leading or aft/trailing end thereof. As each sidewall surface 108 of shank 96 will ultimately be bonded to a corresponding sidewall surface of a neighboring shank, sidewall surfaces 108 are referred to herein as "shank-to-shank bonding surfaces 108."

The bladed pieces 94 are ideally fabricated from an oxidation-resistant material having good mechanical strength at high temperatures. The bladed pieces 94 may be purchased from a supplier or independently fabricated by, for example, individually casting and machining each bladed piece. In a preferred embodiment, each bladed piece 94 is cast from a single crystal superalloy having its crystallographic grain structure oriented to provide optimal mechanical strength in a radial direction. By way of non-limiting example, an oxidation-resistant, single crystal, nickel-based superalloy may be utilized, such as the nickel-based superalloy commercially identified as "CMSX 4." This notwithstanding, the bladed pieces 94 may be fabricated from other high temperature materials, as well, including equiaxed superalloys. Whether fabricated from a single crystal or an equiaxed alloy, the initial fabrication of a plurality of bladed pieces, which are subsequently joined or consolidated into a monolithic bladed ring utilizing a directed thermal growth bonding process of the type described bellow, provides several advantages as compared to single shot casting processes. By initially casting a plurality of individual bladed pieces, any defective or otherwise unusable pieces can be identified prior to consolidation; consequently, scrap volume and cost can be greatly reduced as compared to a single shot casting process wherein any voiding, occlusions, or other defects may require rejection of the entire ring casting. In addition, casting can typically be more reliably and precisely controlled for smaller volume pieces; thus, casting individual bladed pieces generally allows for higher yields due to more reliable filling of the individual bladed pieces and the production of bladed pieces having relatively complex external and internal features, such as internal cooling passages.

Figure 6:
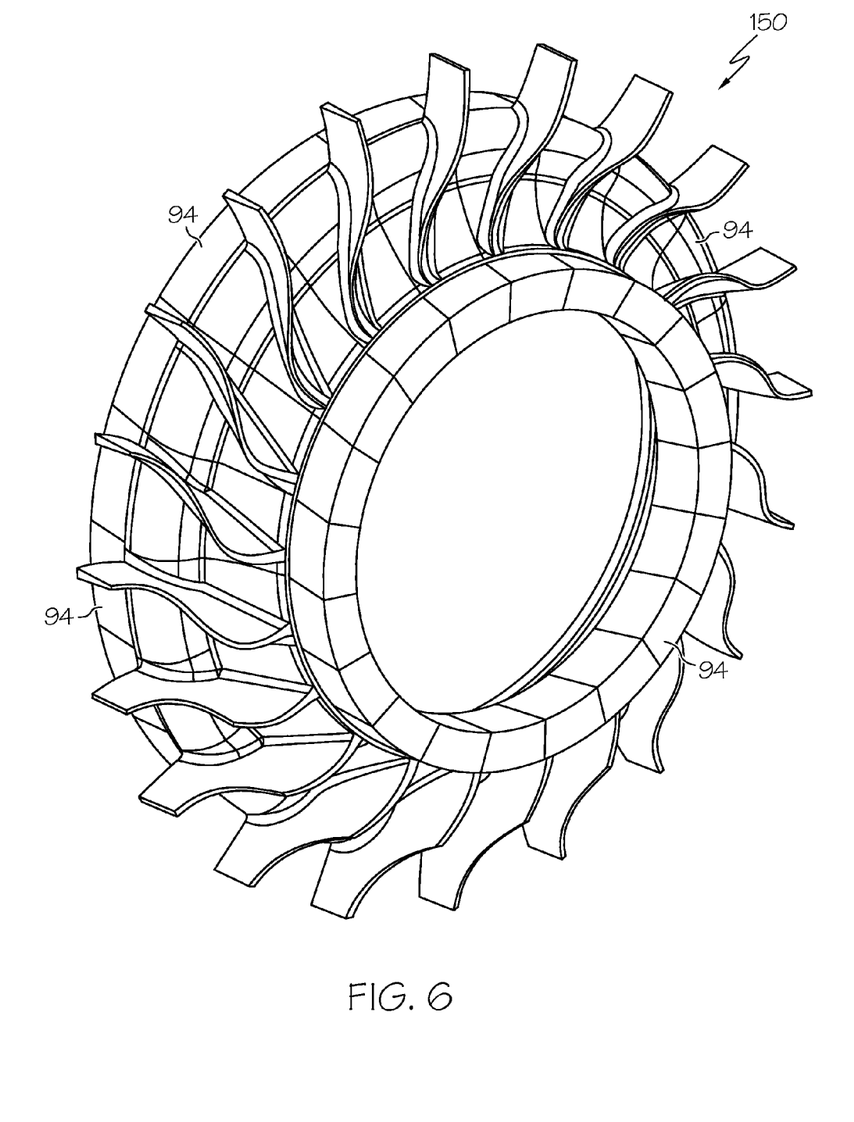
FIG. 6 is a monolithic blade ring formed from a plurality of bladed pieces as shown in FIG. 5.

Bladed pieces 94 are inter-bonded to yield the monolithic bladed ring 150, as shown in FIG. 6, utilizing a metallurgical bonding process, such as diffusion bonding or brazing.

After formation of the monolithic bladed ring 150 as shown in FIG. 6, the monolithic bladed ring 150 may be bonded to a rotor disk (such as may form hub sections 56 or 60) to produce a turbine rotor, such as either of turbine rotors 50 or 52 shown in FIGS. 1 and 3. Bond lines 51a and 51b illustrate such bonding location and orientation with regard to the forward turbine rotor 50 and the aft turbine rotor 52, respectively. The interior of the monolithic bladed ring 150 may be machined to generally conform with the separately-fabricated rotor disk, which is described below in conjunction with FIG. 7.

Figure 7:
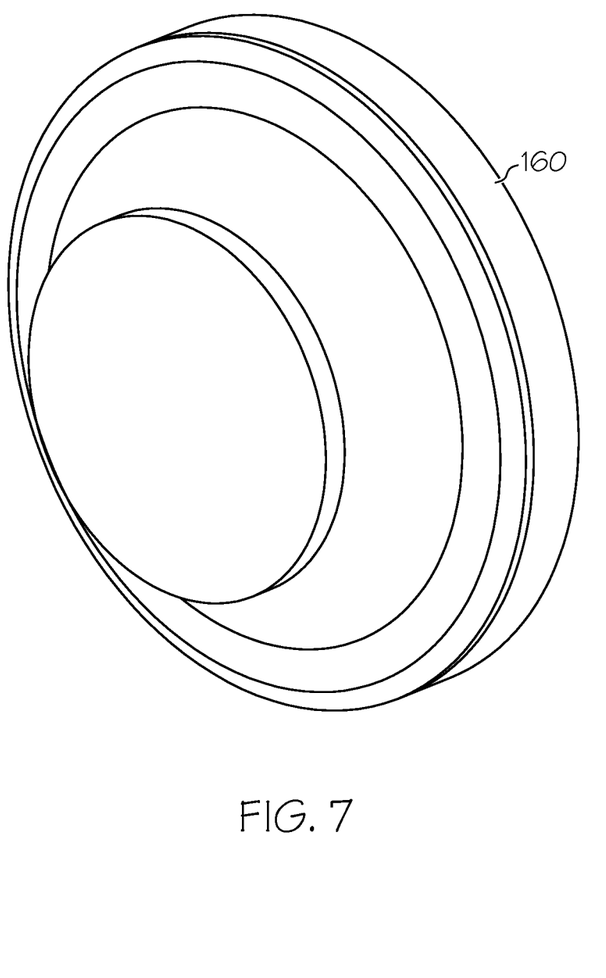
FIG. 7 is an isometric view of an exemplary rotor disk for bonding to the monolithic blade ring of FIG. 6.

FIG. 7 is an isometric view of an exemplary rotor disk 160. Rotor disk 160 is preferably fabricated from an alloy tailored to the unique operational environment of the rotor disk; e.g., an alloy having relatively high stress rupture and life cycle fatigue properties. In one implementation, rotor disk 160 is fabricated from an oxidation-resistant, nickel-based superalloy; while monolithic bladed ring 150 is fabricated from a single crystal superalloy of the type described above. After production of the rotor disk forging, the outer annular portion of rotor disk 160 may be machined to impart disk 160 with a desired surface finish and an outer diameter approximately equivalent to the inner diameter of machined airfoil ring 150. Machined monolithic bladed ring 150 is then fit onto machined rotor disk 160. The leading and trailing annular interfaces between the outer circumference of ring 150 and the inner circumference of disk 160 are sealed by, for example, brazing to prevent the ingress of air into the ring-disk interface that may otherwise interfere bonding. A HIP diffusion bonding process or other directed thermal growth bonding process is then carried-out to bond monolithic bladed ring 150 to rotor disk 160 and thereby yield a metallurgically-bonded turbine rotor, such as either of turbine rotors 50 or 52 shown in FIG. 3.

The foregoing has thus provided embodiments of an axially-split, internally-cooled, radial turbine. Relative to radial turbines produced utilizing individually-inserted blades (e.g., a fir tree interface), radial turbines produced in accordance with the above-described exemplary embodiment reduce production costs and allow for increased cooling in the thermally susceptible saddle region and blade tips.

Furthermore, the foregoing has thus provided embodiments of an axially-split, internally-cooled radial turbine that provides both a mechanical and a cooling advantage to manage disk stresses. As is known in the art, traditional radial turbine stresses occur in the bore, the saddle, and the blade mid-chord. For turbo-shaft applications, for example, a hole in the bore to accommodate the turbine shaft further increases bore stress. Increasing rotational speed and operating temperatures for improved performance further increases all stresses in the turbine. The presently described split radial design, however, manages bore stresses by reducing the disk rim-to-bore thermal gradient, which contributes upwards of 50% of the bore stress. By introducing cooling to the mid-chord region via the split rotor, the overall temperature level of the disk is reduced, which in turn, reduces both steady-state and transient thermal gradients. Furthermore, by turbulating the bore to increase heat up rate of the bore, as is disclosed with regard to the embodiment shown in FIG. 4, the rim-to-bore transient gradient can be further reduced. As such, the embodiments of the present disclosure have the benefits of eliminating the aforementioned blade mid-chord stress problems completely. That is, the saddle region stresses are managed by direct cooling with impingement air from the combustor bypass flow plus indirect cooling by conduction to the blade cooling passages.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. An axially-split radial turbine comprising:
a forward rotor section;
an aft rotor section; and
an inner annular cavity fully defined within the axially-split radial turbine,
wherein the forward rotor section and the aft rotor section are mechanically and abuttingly coupled to one another along an annular interface that resides within a plane generally orthogonal to a rotational axis of the axially-split radial turbine, wherein the forward rotor section comprises a forward blade segment and a forward hub section, wherein the aft rotor section comprises an aft blade segment and an aft hub section, wherein the forward blade segment and the aft blade segment each comprise an internal cooling air flow passage, and wherein the cooling air flow passage of the forward blade segment is directly and fluidly connected to the inner annular cavity via a first inlet opening of the inner annular cavity and the aft blade segment is directly and fluidly connected to the inner annular cavity via a second inlet opening of the inner annular cavity.

2. The axially split radial turbine of claim 1, comprising a hub cooling air passage between the forward hub section and the aft hub section and fluidly connected to the inner annular cavity.

3. The axially split radial turbine of claim 1, wherein when the forward rotor section and the aft rotor section are coupled to one another, the forward blade segment and the aft blade segment define a contiguous radial turbine blade.

4. The axially-split radial turbine of claim 1, wherein the forward hub section defines a first annular cavity groove and wherein the aft hub section defines a second annular cavity groove, and wherein when the forward rotor section and the aft rotor section are coupled to one another, the first and second annular grooves define the inner annual cavity.

5. The axially-split radial turbine of claim 1, wherein a mating interface between the forward hub section and the aft hub section comprise an alignment feature for aligning the forward hub section and the aft hub section when abuttingly coupled.

6. The axially-split radial turbine of claim 1, comprising a tie shaft for abuttingly coupling the forward rotor section to the aft rotor section.

7. The axially-split radial turbine of claim 1, comprising a central opening defined axially through the axially-split radial turbine.

8. The axially-split radial turbine of claim 7, wherein the central opening comprises a sleeve with a plurality of turbulating features for turbulating a cooling air flow.

9. The axially-split radial turbine of claim 1, wherein at least a part of the forward rotor section is made from a first material that is different than a second material from which at least a part of the aft rotor is made.

10. The axially-split radial turbine of claim 9, wherein the first material or the second material comprises an oxidation-resistant, single crystal, nickel-based superalloy.

11. A gas turbine engine comprising:
an axially-split radial turbine comprising:
a forward rotor section;
an aft rotor section; and
an inner annular cavity fully defined within the axially-split radial turbine,
wherein the forward rotor section and the aft rotor section are mechanically and abuttingly coupled to one another along an annular interface that resides within a plane generally orthogonal to a rotational axis of the axially-split radial turbine, wherein the forward rotor section comprises a forward blade segment and a forward hub section, wherein the aft rotor section comprises an aft blade segment and an aft hub section, wherein the forward blade segment and the aft blade segment each comprise an internal cooling air flow passage, and wherein the cooling air flow passage of the forward blade segment is directly and fluidly connected to the inner annular cavity via a first inlet opening of the inner annular cavity and the aft blade segment is directly and fluidly connected to the inner annular cavity via a second inlet opening of the inner annular cavity.

12. The gas turbine engine of claim 11, comprising a combustion bypass conduit for directing cooling air flow to the axially-split radial turbine, wherein the combustion bypass conduit comprises an aperture for directing at least a portion of the cooling air flow toward a leading edge of forward rotor section.

13. The gas turbine engine of claim 11, wherein the axially-split radial turbine is a high-pressure turbine.

14. An axially-split radial turbine comprising:
a forward rotor section;
an aft rotor section, wherein the forward rotor section and the aft rotor section are mechanically and abuttingly coupled to one another along an annular interface that resides within a plane generally orthogonal to a rotational axis of the axially-split radial turbine;
an inner annular cavity fully defined within the axially-split radial turbine; and
a tie shaft for abuttingly coupling the forward rotor section to the aft rotor section wherein the forward rotor section comprises a forward blade segment and a forward hub section metallurgically bonded together along a first bond line and wherein the aft rotor section comprises an aft blade segment and an aft hub section metallurgically bonded together along a second bond line, wherein when the forward rotor section and the aft rotor section are coupled to one another, the forward blade segment and the aft blade segment define a contiguous radial turbine blade, wherein the forward hub section defines a first annular cavity groove and wherein the aft hub section defines a second annular cavity groove, wherein when the forward rotor section and the aft rotor section are coupled to one another, the first and second annular grooves define the inner annual cavity, and wherein the forward rotor section comprises a forward blade segment and a forward hub section, wherein the aft rotor section comprises an aft blade segment and an aft hub section, wherein the forward blade segment and the aft blade segment each comprise an internal cooling air flow passage, wherein the cooling air flow passage of the forward blade segment is directly and fluidly connected to the inner annular cavity via a first inlet opening of the inner annular cavity and the aft blade segment is directly and fluidly connected to the inner annular cavity via a second inlet opening of the inner annular cavity, and wherein the first annular cavity groove extends axially forward of the first inlet opening and the second annular cavity groove extends axially aftward of the second inlet opening.

15. The axially-split radial turbine of claim 14, comprising a central opening defined axially through the axially-split radial turbine, wherein the central opening comprises a sleeve with a plurality of turbulating features for turbulating a cooling air flow.

16. The axially-split radial turbine of claim 1, wherein the inner annular cavity has a width in an axial direction with reference to an axis of rotation of the axially-split radial turbine that is greater than an spacing in the axial direction between the first inlet opening and the second inlet opening.

17. The gas turbine engine of claim 11, wherein the inner annular cavity has a width in an axial direction with reference to an axis of rotation of the axially-split radial turbine that is greater than an spacing in the axial direction between the first inlet opening and the second inlet opening.

* * * * *